No. 762,925. PATENTED JUNE 21, 1904.
O. A. MYGATT.
METHOD OF MAKING PRESSED GLASSWARE.
APPLICATION FILED MAR. 21, 1903.

NO MODEL.

Witnesses
Chas. K. Davis.
M. E. Brown.

Inventor
O. A. Mygatt
By
W. H. Bartlett
Attorney

No. 762,925. Patented June 21, 1904.

UNITED STATES PATENT OFFICE.

OTIS A. MYGATT, OF NEW YORK, N. Y.

METHOD OF MAKING PRESSED GLASSWARE.

SPECIFICATION forming part of Letters Patent No. 762,925, dated June 21, 1904.

Application filed March 21, 1903. Serial No. 148,871. (No model.)

*To all whom it may concern:*

Be it known that I, OTIS A. MYGATT, a citizen of the United States, residing at New York, in the county of New York and State of New York, have invented certain new and useful Improvements in Methods of Making Pressed Glassware, of which the following is a specification.

This invention relates to a method of producing pressed glass whereby the outer and inner surfaces of the glass may be smooth, while the glass will show ornamentation in its body, such as is generally shown either depressed or in relief on its surface.

The object of the invention is to produce a great variety of useful and ornamental glassware largely by the process of pressing, which is a very cheap process, but which articles are not subject to accumulate dust, as are glass articles with uneven surfaces, nor are the ornamental parts so liable to chip and break as are glass articles having projections. The articles made by this method can be very easily washed and can be made ornamental in colors as well as in form.

The invention consists in certain steps used in the production of glass articles and in articles so produced.

Much of the operation and the mechanism used is known to experts in this art. I will describe such additional steps and mechanisms as seem to be involved in the present invention.

Figure 1:
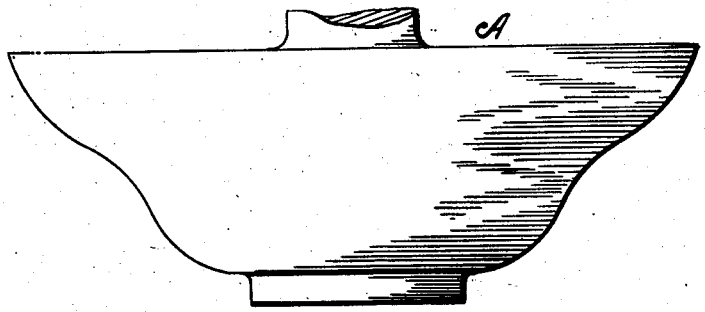
Figure 2:
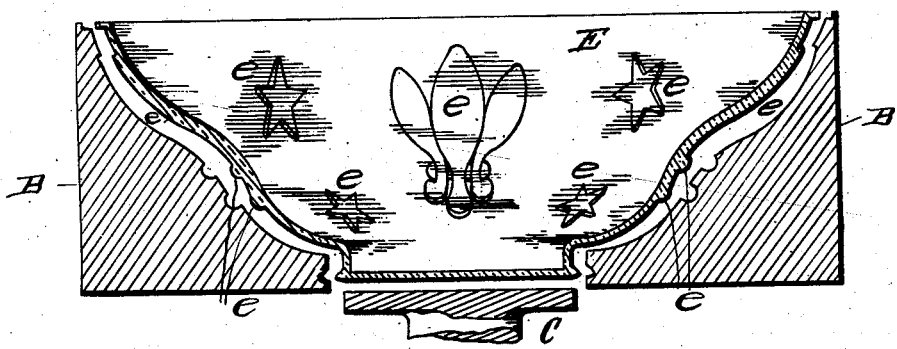
Figure 3:
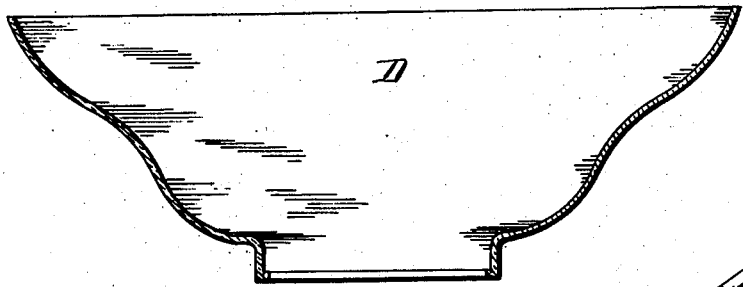
Figure 3:
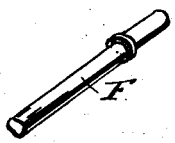
Figure 4:
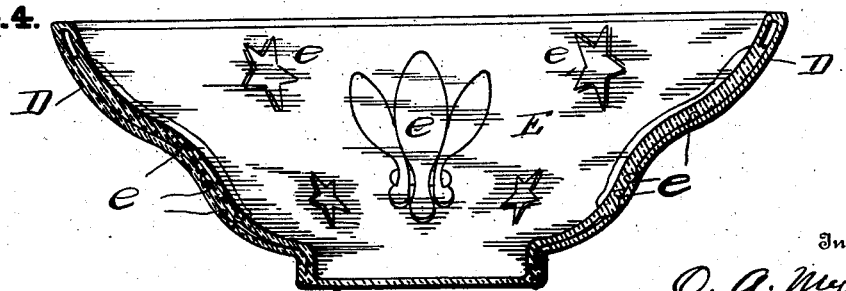
Figure 4:

Figure 1 represents a plunger, as common in molding glass. Fig. 2 represents a sectional mold with an article formed therein, shown in section, the mold having been separated to release the article. Fig. 3 represents a section of an article of thin glass slightly larger than the article of Fig. 2 and of generally similar contour, but without ornamentation. Such articles may be either pressed or blown in a mold in manner well known in this art. Fig. 4 is a sectional view of the articles of Figs. 2 and 3 joined together and the joining edges closed down by tools indicated in the figure.

Let us suppose A to represent a plunger, as common in glass-molding presses, and B B C the separable parts of a glass-mold, the parts B B being ornamented. Such molds are made in almost all forms and in almost any number of parts, and the molds are prepared with depressions or projections of numerous varieties, as the vast number of different ornamental designs in pressed glassware give proof. Let us suppose the article E to have been pressed from glass with ornamental projections *e e e* on its outer surface, either in high or low relief, or even in intaglio. At the same time another article D is formed in a mold, preferably as thin as possible and resembling in contour the article E, but slightly larger. It is deemed unnecessary to illustrate molds in which the article D is formed, as such may be practically a facsimile of mold B minus the ornamentation, or the mold may be of usual character in which an article is blown. The character of the mold is determined by the article to be produced. Immediately after the articles D and E are formed and while still plastic the article E is placed inside of the article D, and as the two are of the same general contour the one incloses the other neatly. Then with a stick or tool F or in other convenient manner the workman compresses the edges of the two articles together. As the plastic glass is still of a wax-like consistency, the glass of the two articles will flow together under the pressure of the tool, thus sealing the joints permanently. The workman will soon learn to distinguish the consistency of the glass under which it can be worked to best advantage. It is not desirable that one article or vessel be placed inside the other until the ornamentation on the ornamented article shall have set so far that it will not become distorted by the application of the other molded part. A blowpipe may be used or hot plastic glass may be used to close the joint. The ornamentation on the molded article may be specially planned for the purpose of inclusion between two surfaces, and certain parts in high relief will serve as bearers to hold the covering vessel out of contact with most of the ornamental parts on the covered vessel, the bearers themselves becoming welded, as it were, between the two parts which go to make up the finished article. Thus in the article illustrated certain figures—for instance, stars may be in high relief on the article E. Even if these coalesce with the article or layer D they will still retain their form and appear as ornamental star-shaped outlines, being visible from both faces of the completed product through the glass. As the air between the two parts or layers D and E will be largely expelled by the high temperature, a partial vacuum will be likely to result in the interstices between the two parts. This vacuum is not objectionable, as the atmospheric pressure tends to compress the more plastic of the two parts of the article more closely to the more rigid one.

One of the sections of the compound article D E may be of one shade or tint of glass and the other of a different shade or tint. As a rule the outer layer of glass will be nearly transparent, so as to more readily show the ornamentation beneath this layer; but in many instances the reverse will be the case, so the ornamental figures may be colored or tinted by the application of color to the ornament before the inclosure of the one part of the article within the other.

While I have described the ornamentation as applied to the interior part of the device and the exterior portion as being smooth, it is apparent that a reversal of these positions might be made. It is also within the spirit of my invention that ornamentation may exist on both the proximate surfaces of the two parts which go to make up the completed article.

The advantages as to cleanliness of ornamental glassware, especially tableware, will be readily understood. By care in construction the weight of the completed article need be but slightly increased over that of common pressed glassware having external ornamentation.

I claim—

1. The method of producing articles of glassware which consists in molding a glass article with ornaments projecting from one face only, inclosing this article while hot in another heated molded glass article of generally similar contour but having smooth surfaces, and uniting the edges of the two parts by a tooling process.

2. The method of producing a hollow article from glass, which consists in pressing a body in form of such article from hot plastic glass in a mold, so that one face is smooth and the other face has ornamental projections, pressing another body of similar form but slightly differing in size by molding from hot plastic glass, inclosing one body within the other with the ornamental face between, while the glass is hot but after its form is "set," then uniting the edges by tooling so that the two bodies become securely attached.

In testimony whereof I affix my signature in presence of two witnesses.

OTIS A. MYGATT.

Witnesses:
I. B. FERGUSON,
W. A. DOREY.